(12) United States Patent
Hodjat

(10) Patent No.: US 7,047,644 B2
(45) Date of Patent: May 23, 2006

(54) CRANKSHAFT DAMPER AND METHOD OF ASSEMBLY

(75) Inventor: Yahya Hodjat, Oxford, MI (US)

(73) Assignee: The Gates Corporation, Denver, CA (US)

( * ) Notice: Subject to any disclaimer, the term of this patent is extended or adjusted under 35 U.S.C. 154(b) by 266 days.

(21) Appl. No.: 10/370,841

(22) Filed: Feb. 21, 2003

(65) Prior Publication Data

US 2004/0166974 A1    Aug. 26, 2004

(51) Int. Cl.
B21K 1/42    (2006.01)
(52) U.S. Cl. .................... 29/892.1; 29/892; 474/178
(58) Field of Classification Search .............. 29/892, 29/892.1, 892.11, 892.3; 474/178, 902; 192/15
See application file for complete search history.

(56) References Cited

U.S. PATENT DOCUMENTS

| | | | |
|---|---|---|---|
| 5,289,712 A | | 3/1994 | Haughian ................. 72/410 |
| 5,409,423 A | | 4/1995 | Ullrich et al. ............. 474/170 |
| 5,465,485 A | * | 11/1995 | Miyake et al. ........... 29/892.11 |
| 5,540,626 A | * | 7/1996 | Asai et al. ................ 474/94 |
| 5,591,093 A | * | 1/1997 | Asai et al. ................ 474/94 |
| 5,695,176 A | | 12/1997 | Colford .................... 267/155 |
| 5,843,264 A | * | 12/1998 | Mabuchi et al. .......... 156/245 |
| 6,065,943 A | | 5/2000 | Suito et al. .............. 417/362 |
| 6,652,234 B1 | * | 11/2003 | MacCuaig ................. 416/62 |

FOREIGN PATENT DOCUMENTS

| | | | |
|---|---|---|---|
| JP | 59-017064 | * | 1/1984 |
| JP | 02093155 | | 4/1990 |
| JP | 05-044779 | * | 2/1993 |
| JP | 05332419 | | 12/1993 |
| JP | 07-259961 | * | 10/1995 |
| JP | 08-135736 | * | 5/1996 |
| JP | 08-159217 | * | 6/1996 |
| JP | 10-103409 | * | 4/1998 |

* cited by examiner

Primary Examiner—Eric Compton
(74) Attorney, Agent, or Firm—J. A. Thurnau, Esq.; C. H. Castleman, Esq.; P. N. Dunlap

(57) ABSTRACT

A crankshaft damper and a method of crankshaft damper assembly using interlocking beads. A crankshaft damper having a hub portion and pulley ring and an elastomeric member disposed in an annular space between them is clamped in a tool after initial assembly. A tool having jaw teeth on oppositely disposed, cooperating jaws engages the crankshaft damper hub portion and pulley ring on either side of the elastomeric member. The tool jaws press on the hub portion and pulley ring to create beads or crimps on the hub portion and the pulley ring. The beads or crimps are formed in cooperating groups or sets. They press the elastomeric member into the form of a curve or wave. The curve or wave mechanically locks the hub portion and pulley ring together, thereby locking the elastomeric member in place between them.

5 Claims, 4 Drawing Sheets

CRANKSHAFT DAMPER AND METHOD OF ASSEMBLY

FIELD OF THE INVENTION

The invention relates to a crankshaft damper and method of assembly, and more particularly to a crankshaft damper and a method of crankshaft damper assembly using interlocking beads between a hub outer flange and a pulley ring inner flange.

BACKGROUND OF THE INVENTION

A common design for crankshaft dampers comprises a metal hub, a metal pulley (inertia ring), and an elastomer sandwiched between the two metal parts. Generally, both metal parts are made from castings. However, some designs have a cast hub and a sheet metal formed pulley or vice versa. Dampers may also be made with formed sheet metal for both the hub and pulley.

The elastomer is usually retained between the metal parts by compression after being forced into the annular space between the two metal parts, with or without chemical bonding. In the case of chemical bonding, the most common agents are adhesives, for example, wet, dry, heat cure, chemical cure and so on. Chemical bonding agents are strong, but can be costly. Chemical bonding agents can also be environmentally unfriendly since many technically acceptable chemical adhesives are solvent based. They can also be very sensitive to process variables. Chemical bonding agents can fail by excessive heat, for example, in a paint oven or adhesive cure oven, by lack of proper cleaning of the components, by exposure to ambient conditions over time, and so on. Therefore, there is a need for a simpler, and more robust process of locking the elastomer between the two metal parts.

Representative of the art is U.S. Pat. No. 5,540,626 (1996) to Asai et al. which discloses a central portion, a belt retaining portion made of metal plate, and a ring-shaped rubber or elastic member placed therebetween. The central portion includes a flange. The flange and the belt retaining portion can have projections which compress the rubber or elastic member to hold it securely in place.

The prior art projections are not cooperatively arranged and only rely upon a compression of the elastic member by pressing of each projection to prevent the elastic member from slipping.

What is needed is a method of crankshaft damper assembly using interlocking beads whereby a predetermined shape is pressed into an elastomeric member. The present invention meets this need.

SUMMARY OF THE INVENTION

The primary aspect of the invention is to provide a method of crankshaft damper assembly using interlocking beads whereby a predetermined shape is pressed into an elastomeric member.

Other aspects of the invention will be pointed out or made obvious by the following description of the invention and the accompanying drawings.

The invention comprises a crankshaft damper and a method of crankshaft damper assembly using interlocking beads. A crankshaft damper having a hub portion and pulley ring and an elastomeric member disposed in an annular space between them is clamped in a tool after initial assembly. A tool having jaw teeth on oppositely disposed, cooperating jaws engages the crankshaft damper hub portion and pulley ring on either side of the elastomeric member. The tool jaws press on the hub portion and pulley ring to create beads or crimps on the hub portion and the pulley ring. The beads or crimps are formed in cooperating groups or sets. They press the elastomeric member into the form of a curve or wave. The curve or wave mechanically locks the hub portion and pulley ring together, thereby locking the elastomeric member in place between them.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
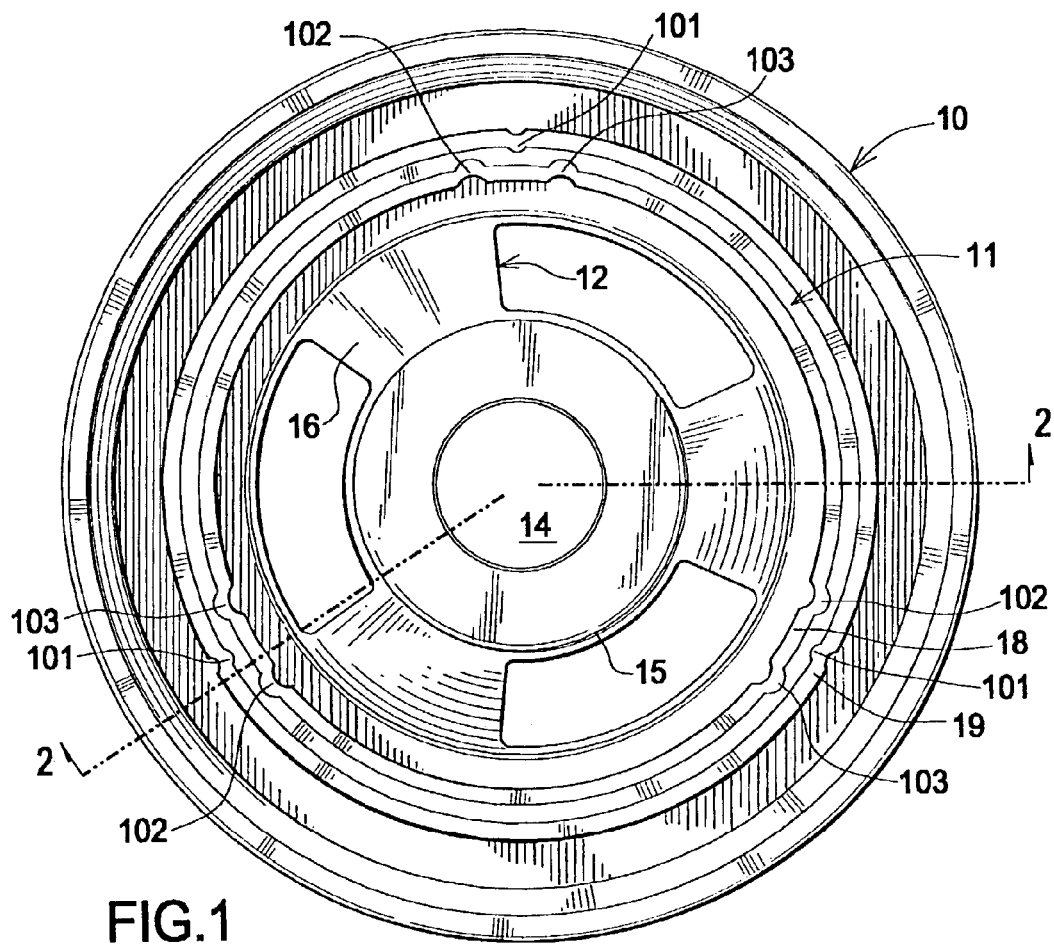
FIG. 1 is a front view of a pulley with interlocking beads.

FIG. 1 is a front view of a pulley with interlocking beads. A crankshaft damper can be manufactured comprising three parts. The parts generally comprise a hub portion 12, a pulley ring 10 and elastomeric member 11.

The hub portion comprises a bore 14 in a shaft engaging portion 15 by which it is connectable to a crankshaft (not shown). The shaft engaging portion 15 is connected to an outer flange 18 by a web 16. Web 16 extends radially outward from a damper axis of rotation A—A. Outer flange 18 cooperates with inner pulley ring flange 19 to form an annular space 13 therebetween, see FIG. 2. Flange 18 and flange 19 may have any form so that annular space 13 has any desired shape as well. Pulley ring 10 is concentrically disposed about hub portion 12. A belt (not shown) engages the pulley ring for power transmission, for example, from an engine crankshaft.

Figure 2:
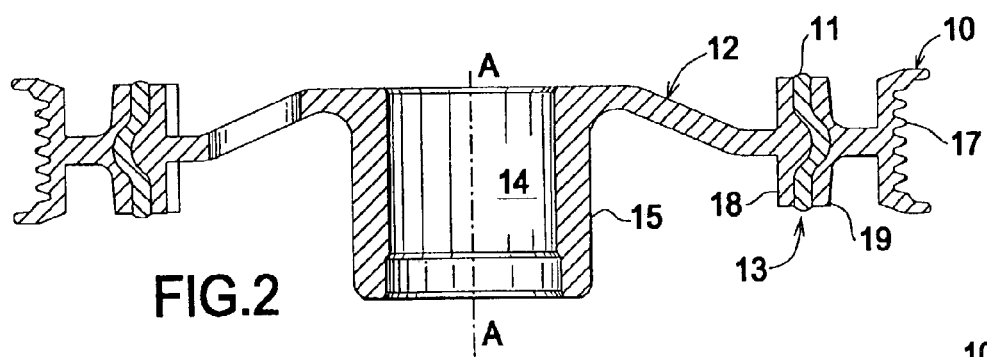
FIG. 2 is a cross-sectional side view at 2—2 in FIG. 1 of a pulley with interlocking beads.

FIG. 2 is a cross-sectional view at 2—2 in FIG. 1 of a pulley with interlocking beads. Disposed in annular space 13 between the hub portion 12 and the pulley ring 10 is the elastomeric member 11. During assembly elastomeric member is pressed into the annular space 13 and thereby subjected to a compression in the range of approximately 20% to 30% of an uncompressed thickness.

The elastomeric member is flexible to absorb and dampen crankshaft vibrations caused by the rotation of the crankshaft to which the damper is connected. The vibrations may be either torsional or radial with respect to a crankshaft axis. The elastomeric member can comprise EPDM, HNBR, or any natural rubber or synthetic rubber, or any combination of any two or more of the foregoing. Hub portion 12 and pulley ring 10 can be manufactured by using spin forming, sheet metal bending or casting methods, each known in the art. The elastomeric member is manufactured to have a predetermined shape using methods known in the art so that the elastomeric member fits properly in annular space 13.

Figure 3:
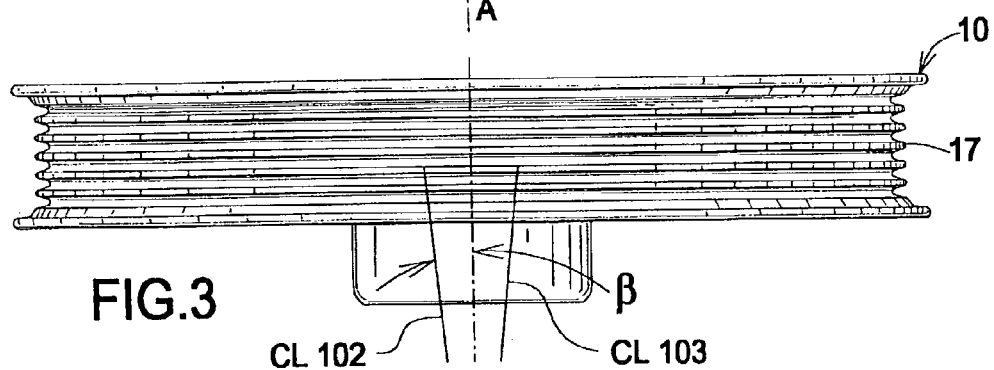
FIG. 3 is a side view of a pulley with interlocking beads.

FIG. 3 is a side view of a pulley with interlocking beads. The inventive method comprises use of beads applied after the damper is assembled to mechanically interlock the hub portion and pulley ring together. Since cast parts are usually thicker than spun formed or press formed sheet metal parts and thereby less deformable, this invention is suited for dampers manufactured using sheet metal components as well.

A centerline CL102 of bead 102 and a centerline CL103 of bead 103 may each describe an angle β with respect to a pulley centerline. Such an angular arrangement between the beads provides further resistance against pullout as described later in this specification.

Figure 4:
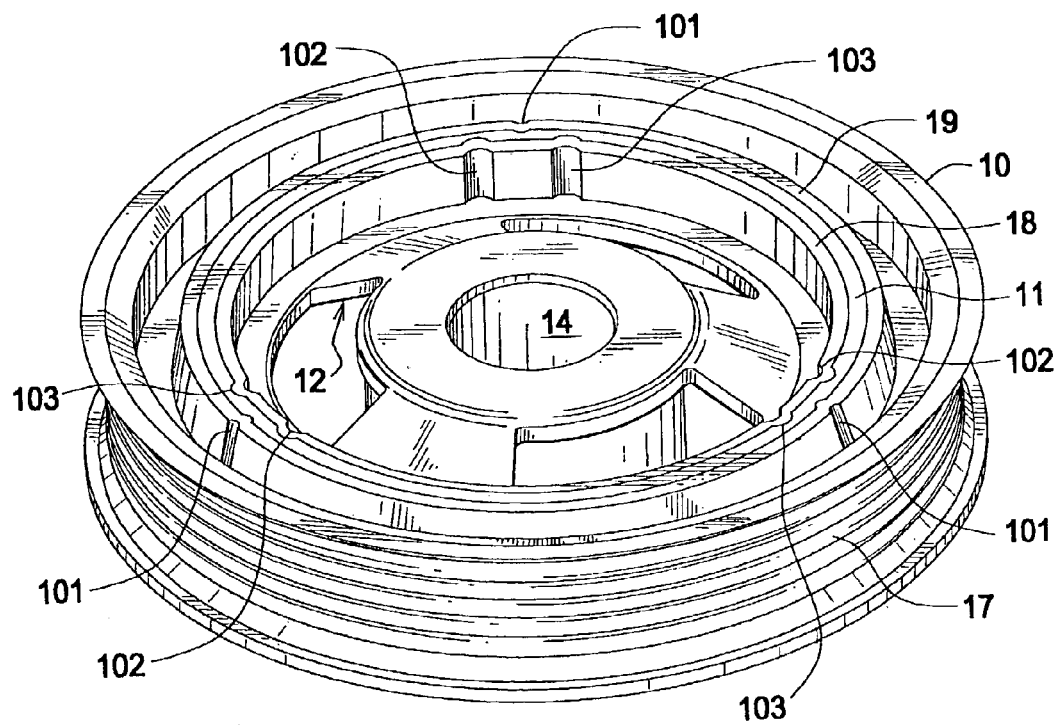
FIG. 4 is a perspective view of a pulley with interlocking beads.

FIG. 4 is a perspective view of a pulley with interlocking beads. Once the damper components are assembled and prior to performing the mechanical interlocking process, the damper is clamped tightly and securely in a tool suited to such purpose. Clamping is necessary to prevent distorting the damper and thereby changing the dimensional characteristics, including run-out, diameter, center-line and so on, during the process of forming the beads or crimps.

Note that beads are generally metal deformations created by presses that move linearly up and down. Crimps are generally formed by tools having jaws and a pivot. More specifically however, beads are metal deformations that are substantially parallel, projecting inward from an edge of the hub portion and the pulley ring, creating a wave in cross-section, See FIG. 7. Straight beads, that is beads parallel to a damper centerline, will create mechanical lock against rotational forces as measured by, for example, torque-to-turn resistance. To create mechanical interlocking against axial forces, for example, push-out resistance, the beads project inward at an angle β, see FIG. 3, that is the beads have an angular relation to a damper centerline which is greater that 0°.

On the other hand crimps do not start on an edge as do beads and they can have many shapes. Namely, crimps are characterized as 'enclosed' metal deformations that create resistance to relative movement of joined components in all directions. A crimp can be cooperating ball-shaped impression and depression. They can also have shapes such as "I", "U", "O", or "V" as well. In this disclosure beads and crimps may be used interchangeably or as the context of the disclosure requires.

Figure 5:
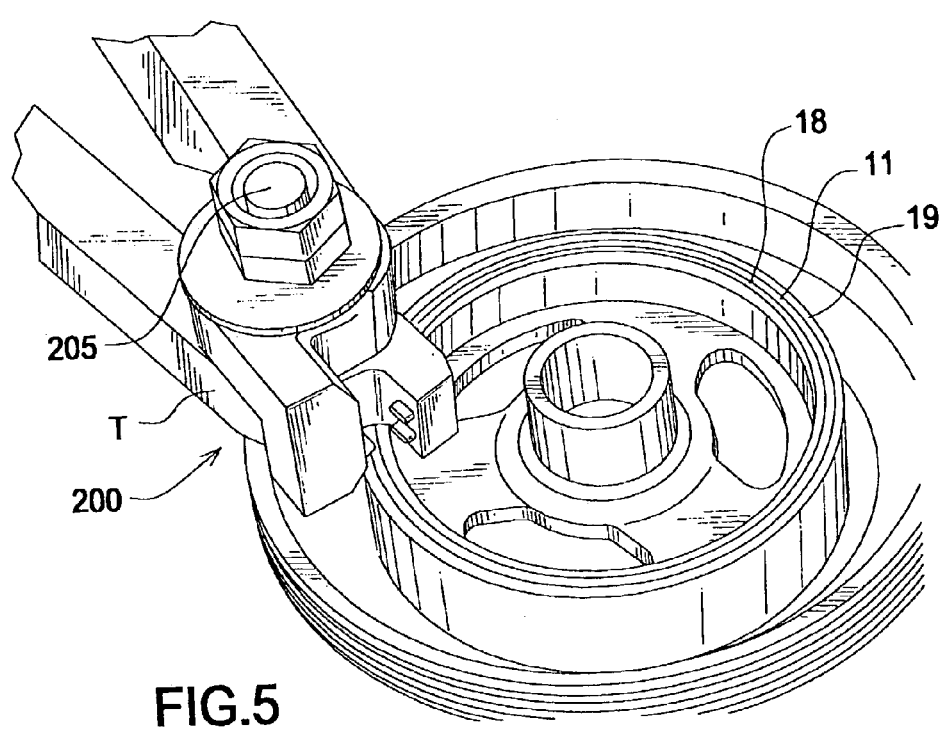
FIG. 5 is a perspective view of a pulley with interlocking beads and a bead tool.

FIG. 5 is a perspective view of a pulley with interlocking beads and a bead tool. Bead tool T comprises jaws 200 and pivot 205. After clamping, the bead tool jaws close on the hub portion flange and the outer ring flange, thereby deforming same to create a bead or crimp.

Figure 6:
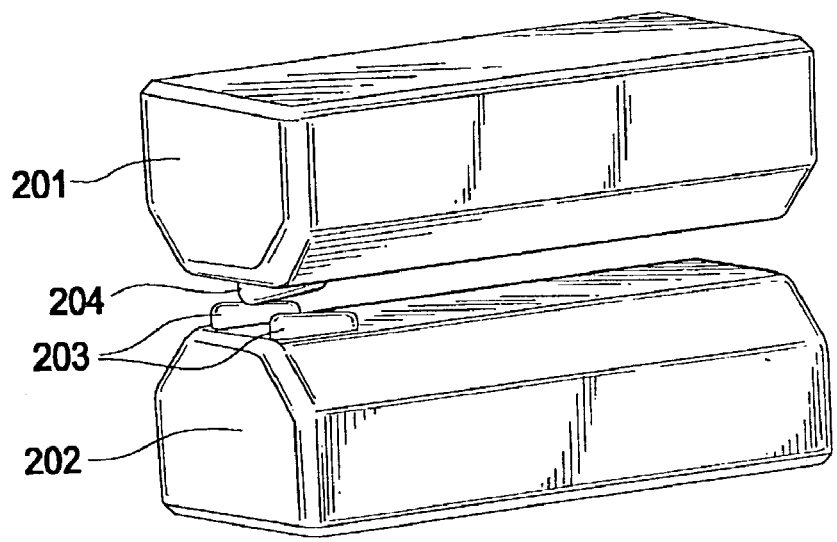
FIG. 6 is a detail of the bead tool jaws.
Figure 7:
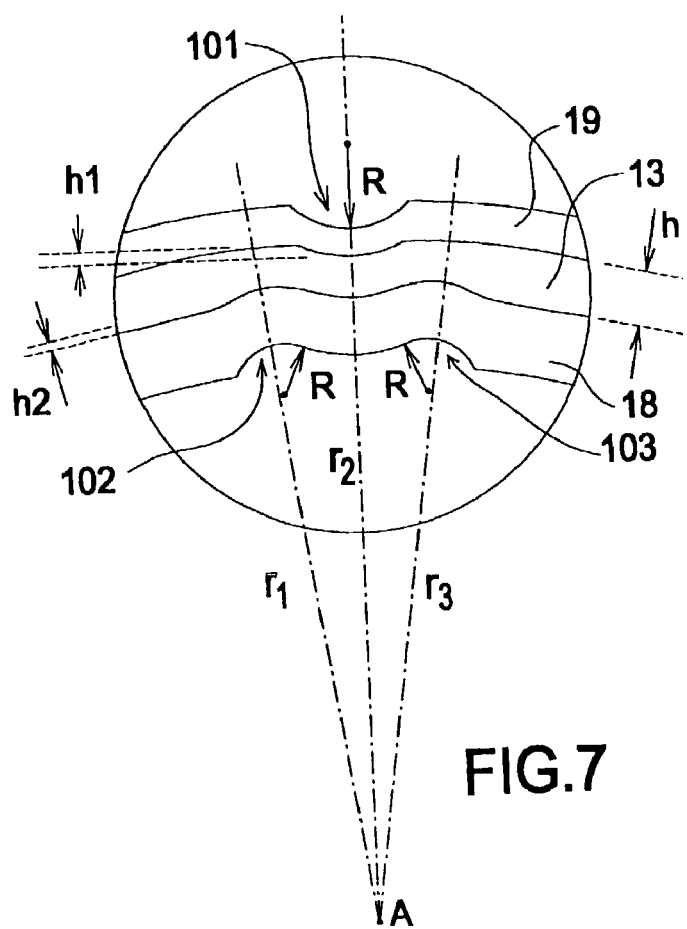
FIG. 7 is a detail of the interlocking beads.

FIG. 6 is a detail of the bead tool jaws. Jaws 201 and 202 are spaced apart from each other. Projections or teeth 203 and 204 are cooperatively disposed on jaws 202 and 201 respectively. A bead as shown in FIG. 7 is formed when jaws 201 and 202 are closed. Tool T, jaws 201, 202 and teeth 203 and 204 may comprise any suitable metallic material. Jaws 201 and 202 may be used in a pivot type tool, such as tool T, or may be used in a press as well, so long as the jaws can be pressed together to form a bead.

Crimping the metal to create a bead mechanically interlocks the elastomeric member in annular space 13. The strength of the mechanical lock is achieved according to a bead height h1 and h2, an angle β of the beads to a damper centerline, and the radius of the beads and/or crimp. Resistance to push out and torque to turn, see below, increases as the metal is deformed more and elastomer is locked tighter between the hub portion and pulley ring. One should note that locking the elastomer tighter does not necessarily mean compressing it more, rather, locking is achieved by curving it to a smaller radius in both radial and axial directions as needed. The elastomer is compressed in a controlled manner to approximately 45% of its uncompressed thickness. For most elastomers compressing in excess of approximately 45% of an uncompressed thickness will result in reduction of the desirable damping properties. Also, the number of beads and/or crimps around a damper comprises three on 120° centers up to a plurality of beads about the entire circumference. Of course, the maximum number of beads and/or crimps depends on the circumference of the damper and the depth and shape of the beads and/or crimps.

FIG. 7 is a detail of the beads. A bead curve, generated by two beads on one flange, 102 and 103, and one on an opposite flange, 101, is sufficient to mechanically interlock the hub portion to the pulley ring. Beads 102, 103 and 101 are cooperatively disposed from each other on radials from a damper centerline A—A, namely r1, r3, and r2 respectively. Beads can be added alternatively to the hub portion flange 18 and the pulley ring flange 19 as needed. A set of three cooperating beads, for example 101, 102, 103 are the minimum number required to properly interlock the hub portion with the pulley ring. Two, three or more three-bead groups or sets may be disposed about the circumference of the outer flange and the inner flange. FIG. 4 depicts three such sets of beads.

The bead group creates a "wave" shape in the deformed metal and more particularly, in the elastomeric member. This prevents a slip turn between the hub portion, the elastomeric member and the pulley ring when under load, that is, when a torque is being transmitted from the pulley to a shaft.

The beads are also disposed at an angle α in a radial direction to a damper centerline that creates sufficient resistance to prevent push out. The beads may also be disposed at an angle β in a longitudinal direction to a centerline as well, see FIG. 3. The angle of either β or α is a function of the part size and other characteristics and each is in the range of approximately 0° to approximately 60°.

Adding additional beads on the hub portion flange and pulley ring flange is accomplished by adding further jaw teeth to jaw 201 in FIG. 6. This creates mechanical locking forces several times the amount realized with three beads. The beads cannot compress the elastomeric member beyond its limits. The elastomeric member is generally under approximately 20–30% compression between the hub portion 12 and the pulley ring 10 when disposed in the annular space 13. A compression of 45% of the elastomeric member between the beads is sufficient to retain the elastomeric member between the outer flange 18 and the inner flange 19.

Figure 8:
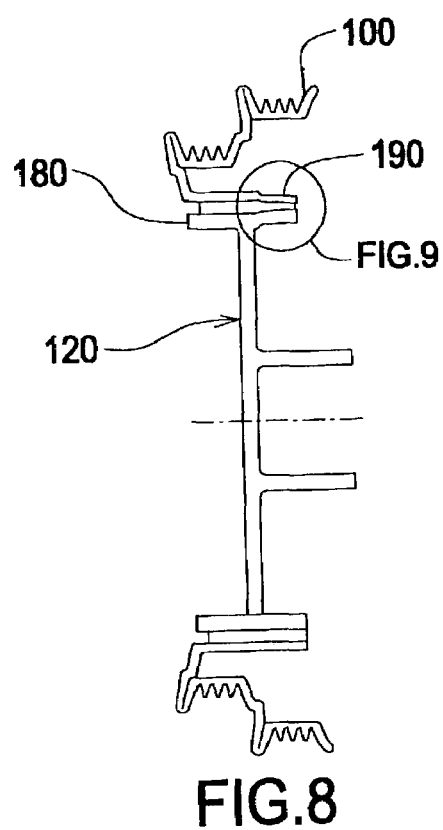
FIG. 8 is a cross-sectional view of a sheet metal pulley.

FIG. 8 is a cross-sectional view of a sheet metal pulley. Pulley ring portion 100 is formed by sheet metal forming methods known in the art. Hub portion 120 has a slightly differently shaped outer flange 180. Further, pulley portion 100 has a slightly differently shaped inner flange 190 so that the annular space is differently shaped from that depicted in FIG. 2. This illustrates that the shape of the annular space is not limited to any particular form for the inventive beads and crimps and can be varied according to the needs of a user.

Figure 9:
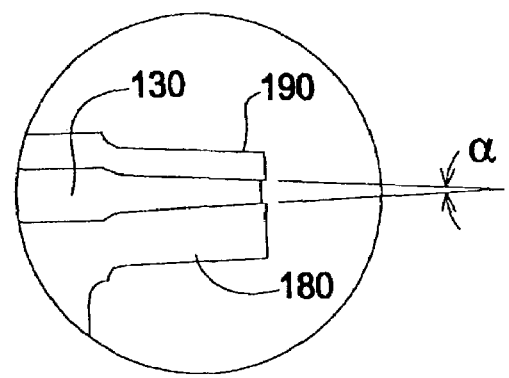
FIG. 9 is a cross-sectional detail of the interlocking beads depicted in FIG. 7.

FIG. 9 is a cross-sectional detail of the beads depicted in FIG. 8. At each bead outer flange 180 and inner flange 190 are crimped together so as to form angle α. Elastomeric member 130 is compressed between the flanges.

The inventive mechanical interlock system can match or exceed chemical bonding adhesion strengths. In the case where the beads and/or crimps are deeper than the thickness of the annular space, values of torque to turn and push out would ultimately have to be sufficient to overcome actually deforming the metal of the hub portion or the pulley ring. Namely, in the case where h1+h2>h, were h is an annular space width. For the hub portion to turn in relation to the pulley ring the beads, which could be compared to the teeth of two engaged gears, would have to be deformed enough to allow such a relative movement. One can appreciate the force needed to cause such a deformation and movement would be several times the value of any chemical bond.

In such a case the presence of elastomer plays a relatively small roll in the amount of torque required. Namely, the torque required to deform the metal "gear" teeth is significantly more than a damper might normally need, and well in excess of what chemical bonding can provide. This example of interlocking "gears" serves to explain the significant radial locking afforded by the invention. The same type of explanation applies to axial locking for push out as well.

In the torque to turn test, one metal component is kept stationary, for example the pulley ring, and the other component, for example the hub portion, is given rotational torque in the direction that the belt and the crankshaft turn. The value of torque at which the slip starts is the torque to turn limit and should not be less than a predetermined amount. In the push out test, one component is kept stationary and the other component is pressed in the direction of the axis of the part. The force at which the lateral slip begins is the push out limit and should not be less than a predetermined amount.

The described mechanical lock can be applied to a damper regardless of the use of a chemical or thermal bond. Namely, it can be used as a reinforcement with a chemical bond or as a stand-alone connection. A sealer can also be added to the metal-elastomer joint to prevent corrosion if required by a user.

Although a form of the invention has been described herein, it will be obvious to those skilled in the art that variations may be made in the construction and relation of parts without departing from the spirit and scope of the invention described herein.

I claim:

1. A method of crankshaft damper assembly comprising the steps of:
    disposing an elastomeric member between a hub portion and a pulley ring;
    compressing the elastomeric member a predetermined amount between the hub portion and the pulley ring;
    pressing a bead into a flange of the hub portion;
    pressing two cooperating beads into a flange of the pulley ring oppositely disposed from the bead in the flange of the hub portion thereby forming a wave shape in the elastomeric member therebetween;
    disposing at least one of the beads at an angle ($\beta$) to a crankshaft damper centerline (A—A); and
    retaining the elastomeric member thereby.

2. The method as in claim 1 comprising the steps of:
    bonding the elastomeric member to the hub portion and pulley ring.

3. The method as in claim 1 comprising the steps of:
    chemically bonding the elastomeric member to the hub portion and the pulley ring.

4. The method as in claim 1 comprising the steps of:
    thermally bonding the elastomeric member to the hub portion and the pulley ring.

5. The method as in claim 1 comprising the step of:
    compressing the elastomeric member approximately 15% to 25% more than the predetermined amount between the beads.

* * * * *